United States Patent [19]

Ballhaus

[11] Patent Number: 4,565,379
[45] Date of Patent: Jan. 21, 1986

[54] MAGNETIC FLUID SEAL

[75] Inventor: Heribert Ballhaus, Nuremberg, Fed. Rep. of Germany

[73] Assignee: GMN Georg Muller Nurnberg GmbH, Fed. Rep. of Germany

[21] Appl. No.: 691,436

[22] Filed: Jan. 14, 1985

[30] Foreign Application Priority Data

May 26, 1984 [DE] Fed. Rep. of Germany ....... 3419812

[51] Int. Cl.⁴ .............................................. F16J 15/42
[52] U.S. Cl. ....................................... 277/25; 277/80; 277/135
[58] Field of Search ............................ 277/80, 25, 135

[56] References Cited

U.S. PATENT DOCUMENTS 4,200,296 4/1980 Holliston et al. .................... 277/135
4,304,411 12/1981 Wilcock ................................. 277/25
4,335,885 6/1982 Heshmat ............................... 277/25
4,526,380 7/1985 Raj et al. ............................... 277/80

Primary Examiner—Robert I. Smith
Attorney, Agent, or Firm—Steinberg & Raskin

[57] ABSTRACT

A magnetic fluid seal provided in a sealing gap defined between an inner surface of an outer rotor and the outer periphery of a disc-shaped magnet includes magnetic liquid situated in the sealing gap and the improvement wherein the inner surface of the outer rotor is inclined so that in a cross-section through a plane containing the axis of rotation of the rotor, the inner surface forms an angle with the axis of rotation of the rotor whereby retention of the magnetic liquid in the sealing gap is facilitated by the reaction forces to the centrifugal forces acting on the magnetic liquid during operation.

5 Claims, 4 Drawing Figures

MAGNETIC FLUID SEAL

BACKGROUND OF THE INVENTION

The present invention relates to magnetic seal devices which form seals between concentric components which rotate relative to each other, and, more particularly, to a magnetic liquid seal device which forms a seal in apparatus having an outer rotating component, such as a motor having an outer rotor which rotates around an inner shaft.

There are many instances where gaps between equipment components which rotate with respect to each other must be sealed. For example, in the case of magnetic data disc storage equipment used in data processing applications, it is important to hermetically seal the rotating equipment component in a manner such that vapors generated by gas emitting lubricants cannot enter into the area of the data discs. Such seals must be of high reliability, and, additionally have very low friction moments.

Magnetic liquid seal devices which form seals between rotating equipment components are known. European Patent Specification (EPS) No. 79 30 27 86.3 (Publication No. 0 012 556 B1) discloses a magnetic fluid seal constituted by a disc-like magnet magnetized in an axial direction positioned between the rotating components and fixed to one of them, and magnetic liquid held around a peripheral edge of the disc-like magnet by a magnetic field which passes from the pole on one face of the disc-like magnet through the magnetic liquid and back to the pole on the opposite face of the disc-like magnet to form the seal. The magnetic liquid is thus held in position exclusively under the effect of the magnetic flux. The above-mentioned EPS discloses embodiments in FIGS. 3, 5 and 6 wherein the sealing gap is formed between the inner periphery of the disc-like magnet and the rotating inner shaft. In another embodiment illustrated in FIG. 4 of the EPS, two sealing gaps are formed at the inner and outer peripheries of the disc-like magnet so that the disc-like magnet is adapted to rotate relative to both the inner shaft and an outer housing. This sealing arrangement is advanageous in that it is of relatively low cost construction and does not require much room. On the other hand, it is not entirely satisfactory in that the magnetic flux field will have a relatively low intensity so that its reliability is diminished with larger differences in pressure across the seal and/or at higher rotational speeds.

These disadvantages are eliminated by another known magnetic fluid seal arrangement wherein additional disc-like magnets are utilized to achieve greater magnetic flux field intensities in the sealing gap. However, this sealing arrangement has the serious disadvantage that the shaft to be sealed must be formed of a nonmagnetic material. After the shaft has been assembled, the seal gap can no longer be filled with the magnetic liquid. When the shaft is formed of ferromagnetic material, the magnetic liquid would be wiped off during assembly. A further disadvantage of the sealing arrangement is that it requires considerable room for installation due to the use of the additional disc-like magnets.

SUMMARY OF THE INVENTION

It is an object of the present invention to provide a new and improved magnetic liquid seal device of simple construction for forming a reliable seal between concentric rotating components and which eliminates the disadvantages of conventional magnetic liquid seal devices discussed above.

Another object of the present invention is to provide a new and improved magnetic liquid seal device for forming a reliable seal at a gap formed between an outer rotor which rotates around an inner shaft.

Still another object of the present invention is to provide a new and improved magnetic liquid seal device for forming a reliable seal at a gap formed between an outer rotor which rotates around an inner shaft at rotational speeds of high magnitude at which the seals provided by conventional magnetic liquid seal devices break down.

A further object of the present invention is to achieve a reliable magnetic liquid seal in apparatus having an outer rotor which rotates at high speeds and/or which has a relatively large diameter and/or which is formed of ferromagnetic material.

Briefly, in accordance with the present invention, these and other objects are obtained by providing a magnetic liquid seal device where the magnetic fluid is contained in the sealing gap not only by the magnetic flux field, but, additionally, retained under the effects of centrifugal force. In particular, a disc-shaped magnet is affixed to the inner stationary shaft along its inner periphery so that its outer periphery forms a sealing gap with the inner surface of the outer rotating rotor. In accordance with the invention, the inner gap-defining surface of the outer rotating rotor is, in a cross-section through a plane containing the axis of rotation of the rotor, inclined so that it forms a first angle $\Psi$ with the axis of rotation. Stated another way, when the lower edge surface of the rotor is substantially perpendicular to the rotor's axis of rotation, in a cross-section through a plane containing the axis of rotation of the rotor, the gap-defining surface of the rotor forms a second angle $\phi$ with the lower edge surface which is substantially equal to $90° - \Psi$.

In this manner the radius of the sealing gap increases along the height of the sealing gap. Consequently, the velocity of the fluid particles in the magnetic liquid forming the gap seal increases in the upper direction of the disc-shaped magnet at the interface of the magnetic liquid and the inclined inner surface of the rotor. There is a linear relationship between the radius of the sealing gap and the velocity of the magnetic liquid particles at its outer periphery and the centrifugal force acting on the fluid particles is directed perpendicularly to the rotor's axis of rotation towards the inclined inner surface of the rotor. Due to the inclination of the inner rotor surface, the reaction force to the centrifugal force has a component which is directed generally upwardly into the sealing gap, i.e., away from the lower edge surface of the rotor. The upward reaction force component acts to prevent the magnetic liquid from flowing out of the sealing gap at high rotational speeds or where the outer diameter of the sealing gap is large.

An axially inner portion of the inner gap-defining surface of the rotor is preferably inclined at an approprite angle with respect to the axis of rotation whose direction is opposite to the direction of the first angle $\Psi$. In this manner, the sealing gap is balanced so that on the one hand the weight of the magnetic liquid corresponds to the retaining force provided by the magnetic flux field of the disc-shaped magnet while on the other hand, an undesirable contraction of the magnetic liquid within the gap to less than half the thickness of the disc-shaped magnet as a consequence of the centrifugal force is prevented.

DETAILED DESCRIPTION OF THE DRAWINGS

A more complete appreciation of the present invention and the various advantages thereof will be readily understood by reference to the following detailed description considered in connection with the accompanying drawings in which.

DESCRIPTION OF THE PREFERRED EMBODIMENTS

Figure 1:
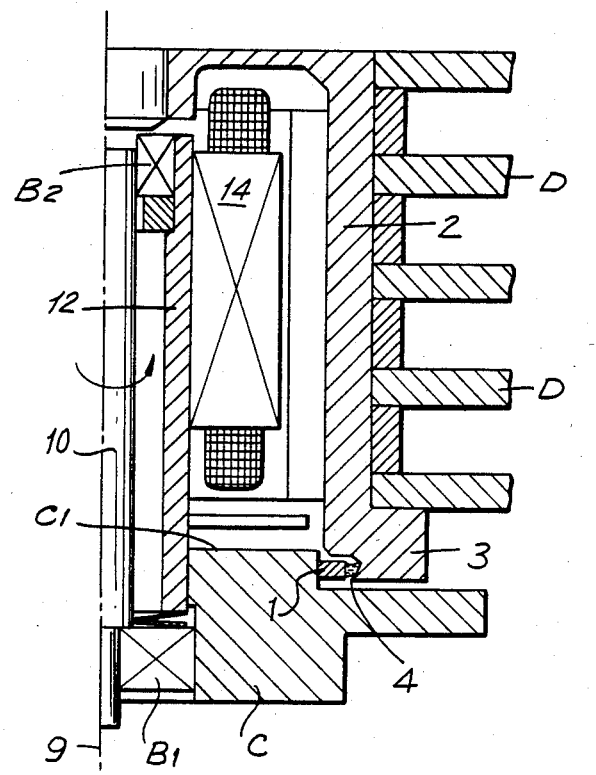
FIG. 1 is a partial elevation view in section of magnetic data disc storage apparatus incorporating a magnetic seal device in accordance with the invention.

Referring to the drawings wherein like reference characters designate identical or corresponding parts throughout the several views, and more particularly to FIG. 1, a symmetrical half of a magnetic data disc storage apparatus incorporating a magnetic seal device is illustrated, it being understood that a substantial mirror image of the right-hand illustrated portion exists at the left-hand side of the line of symmetry. The apparatus includes a disc pack including a plurality of magnetic storage discs D fixed to an outer rotor 2. The outer rotor 2 is mounted for rotation with an inner shaft 10 situated in a space defined within rotor 2, the space being closed on one end by a base plate C. A stator bushing 12 and stator winding 14 surround shaft 10.

A magnetic seal device is provided to hermetically seal the entire interior space within rotor 2 in which bearings $B_1$ and $B_2$ are situated from the area from which the data discs D are situated. The lower end of rotor 2 is formed with a peripheral collar 3 which extends outwardly beyond the envelope of the main portion of rotor 2. The inner axially extending surface $S_1$ of collar 3 (FIGS. 2–4) constitutes the outer gap-defining surface of a sealing gap 4. The base plate C in turn is formed with a central portion $C_1$ having an outer axially extending surface which is concentric with and spaced inwardly from rotor inner surface $S_1$. A disc-like magnet 1 magnetized in an axial direction is fixed at its inner periphery to the fixed central stub portion $C_1$ so that its outer peripheral surface $S_2$ is concentric with and spaced inwardly from the rotor inner surface $S_1$ to constitute the inner gap-defining surface of sealing gap 4. Magnetic liquid 5, which may comprise oil carrying ferrite particles therein as is well known, is situated in the gap 4 defined between surfaces $S_1$ and $S_2$ to effect a seal from the fixed disc-shaped magnet 1 to the rotating outer rotor 2. The dimension of collar 3 in which the gap 4 is rotated and filled with magnetic fluid 5 is standardized as is the outer diameter of rotor 2. Rotor 2 is formed of a magnetically soft material which is necessary to screen the magnetic data storage discs from flux leakage fields. It is noted that the available height of sealing gap 4 is insufficient to accommodate additional disc-shaped magnets.

Figure 2:
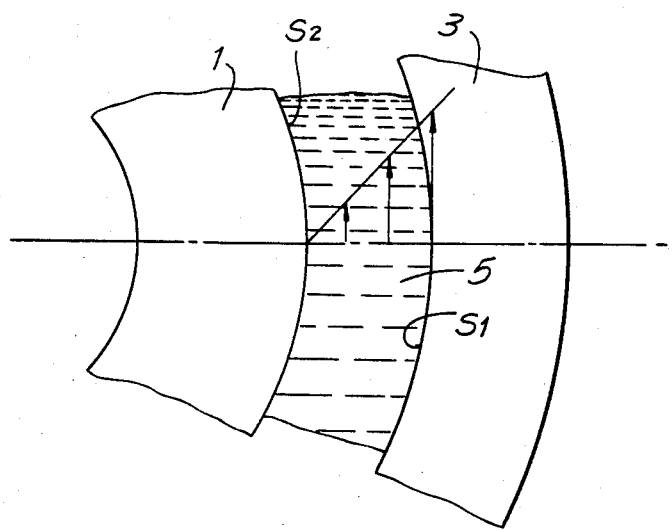
FIG. 2 is a transverse section view through a gap sealed by a magnetic seal device showing a typical stationary velocity profile of magnetic liquid fluid particles in the sealing gap.
Figure 3:
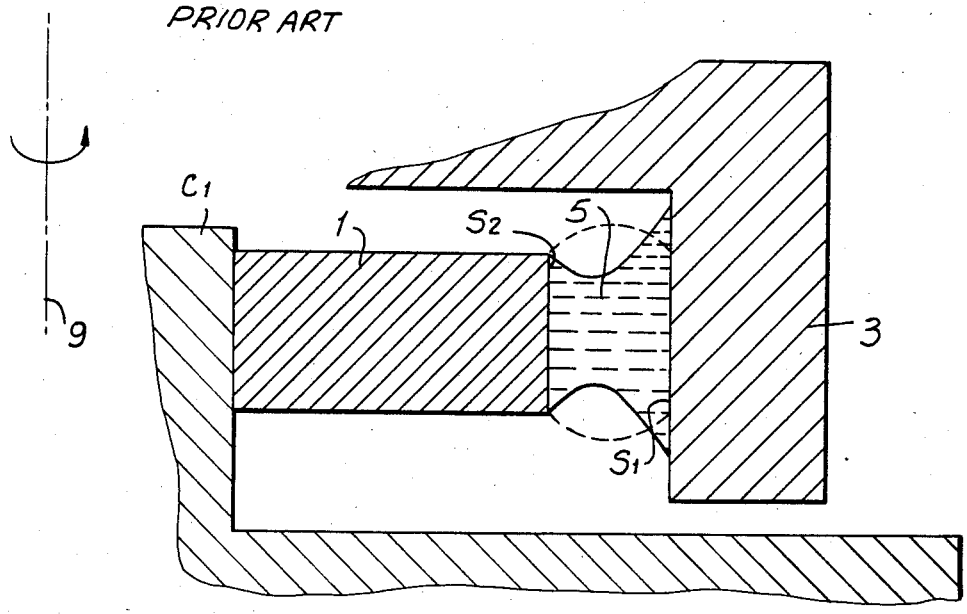
FIG. 3 is an enlarged detailed view of a conventional magnetic field device in accordance with the prior art.

During operation of the apparatus, i.e., during rotation of rotor 2, a stationary velocity profile of the magnetic liquid 5 as shown in FIG. 2 exists. As seen in FIG. 2, there is a linear relationship between the effective radius of the sealing gap and the velocity of the magnetic field at each radius. Referring to FIG. 3, in accordance with the prior art, the centrifugal force acting on the fluid particles of the magnetic fluid is directed towards the force of attraction of the magnetic flux field of the disc-shaped magnet 1 so that the magnetic liquid layer contracts from the dotted line profile seen in FIG. 3 which exists when rotor 2 is stationary to the solid line profile which exists when rotor 2 is rotating. This contraction of the magnetic liquid layer reduces the permissable difference in pressure across the sealing gap and such permissable difference further diminishes with increases in rotational speeds of the rotor. After a certain critical speed is reached by the rotor, the magnetic liquid 5 will be ejected from the sealing gap 4 even when the difference in pressure across the gap 5 is minimal.

Figure 4:
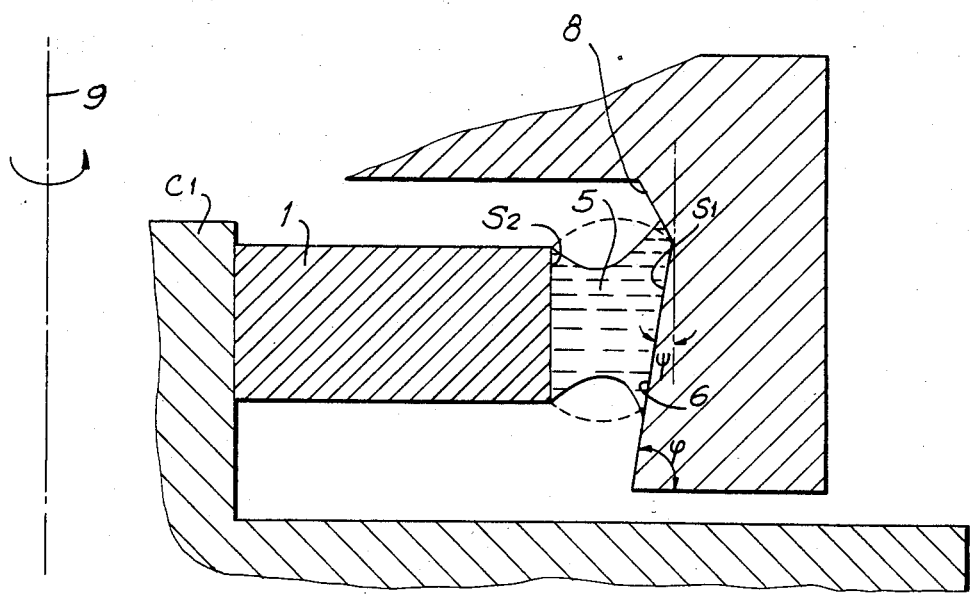
FIG. 4 is a view similar to FIG. 3 showing a magnetic sealing device constructed in accordance with the present invention.

Referring to FIG. 4, in accordance with the present invention, the inner gap-defining surface $S_1$ of the outer rotating rotor 2 is formed with an axially outer portion 6 which is inclined so that in a cross-section through a plane containing the axis of rotation 9 of rotor 2 it forms an angle $\Psi$ with the axis of rotation 9. In the case where the lower edge, surface 7 of rotor 3 is substantially perpendicular to the rotors axis of rotation in a cross-section through a plane containing the axis of rotation of the rotor, the axially outer portion 6 of the inner gap-defining surface $S_1$ of the rotor 2 forms an angle $\phi$ with the lower edge surface 7 which is substantially equal to $90° - \Psi$. Preferably, the angle $\Psi$ is in the range of between about 5° while the angle $\phi$ is in the range of between about 60° to 85°. The angle $\Psi$ may not be too large, since in such a case the gap would be too large.

As seen in FIG. 4, the radius of the sealing gap increases along the height of the sealing gap so that the velocity of the fluid particles in the magnetic liquid increases in the upper direction of the disc-shaped magnet at the interface of the magnetic liquid and the inclined inner surface of the rotor. Due to the inclination of the surface portion 6, the reaction force to the centrifugal force has a component which is directed generally axially into the sealing gap, i.e., away from the lower edge surface 7 of the rotor which prevents the magnetic liquid from flowing out of the sealing gap at high rotational speeds or where the outer diameter of the sealing gap is large.

An axially inner portion 8 of the inner gap-defining surface $S_1$ is inclined at an angle with respect to the axis of rotation 9 which is opposite to the direction of angle $\Psi$. In this manner the sealing gap is balanced so that on the one hand the weight of the magnetic liquid corresponds to the retaining force provided by the magnetic flux field of the disc-shaped magnet 1. On the other hand, the contraction of the magnetic liquid within the gap from the rotor at the rest profile shown in phantom FIG. 4 to the in-operation profile shown in solid lines is not as great as in the case of conventional magnetic seal devices which allows for greater pressure differentials and greater rotor speeds.

Rotors of magnetic storage devices are usually operated at about 3600 rpm. With conventionally designed sealing gaps the magnetic fluid is normally ejected from the gap at speeds well below that speed when magnetic storage discs with conventional dimensions are used. Thus, it has not been possible to utilize conventional magnetic sealing devices in such applications. However, the present invention for the first time allows such use. It provides the important advantage that in some cases a clean interior space is not required during assembly of the motor thus making large cost savings possible. As the rotor and magnets are completely sealed, only the final cleaning process, the filling of the seal with the magnetic liquid, the performance check and packaging must be performed in the clean environments which are standard in the assembly of magnetic disc storage apparatus.

Obviously, numerous modifications and variations of the present invention are possible in the light of the above teachings. It is therefore to be understood that within the scope of the claims appended hereto, the invention may be practiced otherwise than as specifically disclosed herein.

What is claimed is:

1. In apparatus including a rotatable outer rotor, said outer rotor being rotatable about an axis of rotation and having an inner surface defining a sealing gap with an outer periphery of a substantially disc-shaped magnet, magnetic liquid being situated in said sealing gap to form a sealing devvice, the improvement comprising:

said inner surface of said outer rotor is inclined so that in a cross-section through a plane containing the axis of rotation of the rotor, said inner surface forms a first angle with said axis of rotation, whereby said magnetic liquid is retained in said sealing gap by the reaction forces to centrifugal forces acting on said magnetic liquid in addition to the magnetic flux of said disc-shaped magnet.

2. The combination of claim 1 wherein said first angle is in the range of between about 5° to 30°.

3. The combination of claim 1 wherein said inner surface of said outer rotor has an axially inner portion which is inclined so that in a cross-section through a plane containing the axis of rotation of the rotor, said axially inner portion forms an angle with said axis of rotation which is directed in an opposite direction to said that of first angle.

4. The combination of claim 1 wherein the sealing effect provided by said magnetic liquid increases with the speed of rotation of said rotor.

5. The combination of claim 1 wherein said outer rotor is mounted on a shaft assembly situated within an interior space of said outer rotor, and wherein only a single one of said sealing devices seals said interior space of said outer rotor.

* * * * *